US00RE37939E

(19) United States
(12) Reissued Patent
Tilak

(10) Patent Number: US RE37,939 E
(45) Date of Reissued Patent: Dec. 24, 2002

(54) INDEPENDENTLY POSITIONED GRAPHITE INSERTS IN ANNULAR METAL CASTING MOLDS

(76) Inventor: Ravindra V Tilak, 5261 Nantucket La., Anaheim Hills, CA (US) 92807

(21) Appl. No.: 09/910,607

(22) Filed: Jul. 23, 2001

Related U.S. Patent Documents

Reissue of:
(64) Patent No.: 6,192,970
Issued: Feb. 27, 2001
Appl. No.: 09/301,655
Filed: Apr. 28, 1999

(51) Int. Cl.[7] ..... B22D 11/049
(52) U.S. Cl. ..... 164/418; 164/444
(58) Field of Search ..... 164/418, 459, 164/443, 444, 485, 487, 472

(56) References Cited

U.S. PATENT DOCUMENTS

| | | | |
|---|---|---|---|
| 4,693,298 | A | 9/1987 | Wagstaff |
| 4,947,925 | A | 8/1990 | Wagstaff et al. |
| 6,192,970 | B1 | 2/2001 | Tilak |

*Primary Examiner*—Kuang Y. Lin
(74) *Attorney, Agent, or Firm*—Stetina Brunda Garred & Brucker

(57) ABSTRACT

A molten metal casting annulus comprising an insert support and cooling frame and a multiplicity of graphite casting annulus insert components supported entirely without clamping on said inset support and cooling frame and a method manufacturing the same are disclosed.

19 Claims, 1 Drawing Sheet

INDEPENDENTLY POSITIONED GRAPHITE INSERTS IN ANNULAR METAL CASTING MOLDS

Matter enclosed in heavy brackets [ ] appears in the original patent but forms no part of this reissue specification; matter printed in italics indicates the additions made by reissue.

FIELD OF THE INVENTION

This invention relates to the continuous casting of molten metal, e.g. aluminum and its alloys, into ingots of indeterminate length. More specifically, this invention relates to methods of making molds for continuous casting of molten metals and to the construction of such molds.

BACKGROUND OF THE INVENTION

Continuous casting of molten metals into ingots of any desired length is well-known and many molds to permit continuous casting of, for example, aluminum and aluminum alloys have been described in the art.

Wagstaff, et. al., in U.S. Pat. No. 3,688,834, Sep. 5, 1972, described one mold construction for continuous casting of molten metals, this patent being directed to the inherent problem of thermal warpage of the mold arising from temperature differentials. Since, portions of the mold are water cooled and portions of the mold are in contact with the molten metal thermal warpage is inherent in the structure.

Wagstaff, et. al. for over a quarter century have been designing and improving molds for continuous casting of molten metals. The above-mentioned patent and those referred to hereinafter are incorporated herein as representing the development of the art and the present state of the art. The following Wagstaff, et. al., United States patents are incorporated by reference: U.S. Pat. No. 3,739,837, Jun. 19, 1973, (cooling chamber construction); U.S. Pat. No. 4,598, 763, Jun. 8, 1986 (directly cooled, unitary annular graphite casting ring); U.S. Pat. No. 4,693,298, Sep. 15, 1987, (controlling direct cooling rate of graphite in continuous casting of molten metal); U.S. Pat. No. 4,947,925 (direct cooling of graphite casting ring made up of clamped graphite components); U.S. Pat. No. 5,191,924, Mar. 9, 1993 (built-up ingot mold having a large pair and a small pair of cooled plates with corner fittings); U.S. Pat. No. 5,318,098, Jun. 7, 1994 (graphite ring casting mold); U.S. Pat. No. 5,323,841, Jun. 28, 1994 (annular casting mold frame supported below, rather then above, a graphite casting mold made up of clamped components); and U.S. Pat. No. 5,518, 063, May 21, 1996 and U.S. Pat. No. 5,685,359, Nov. 11, 1997) (continuous casting apparatus having graphite casting ring and use of liquid that cools the mold to directly cool the cast metal).

In addition, U.S. Pat. No. 5,678,623, Oct. 21, 1997, to Steen et. al., which discloses a permeable unitary graphite casting ring, is incorporated herein by reference.

While the foregoing are considered to accurately represent the state of the art, there are many other patents and many publications that bear upon the subject.

The difficulties in making large graphite casting rings has been described and some solutions have been proposed, for example, in U.S. Pat. No. 4,947,925, which describes the graphite casting annulus made by clamping graphite side pieces and end pieces together. There term "annulus" is used herein generally in the same sense as that term is used in said U.S. Pat. No. 4,947,925, i.e. to mean an enclosed space, which may or may not be circular, surrounded by graphite. U.S. Pat. No. 5,323,841 discloses a similarly constructed annular casting annular made up of clamped components.

Graphite casting annulus structures have, in the past, generally been round and generally been made of a unitary piece of graphite. The practice, still in wide use has many obvious advantages.

It is, however, difficult to make a large unitary casting annulus of a non-circular nature with machining, heating and forming equipment commonly available in the machine shop of a metal foundry or metal casting machine manufacturer.

Wagstaff, et. al., inter alia, proposed making a graphite casting annulus out of a plurality of graphite components, e.g., a pair of sides and a pair of ends. Since the entire graphite annulus must be liquid tight, i.e., there must be no space in the casting annulus into which the molten metal can flow, it is of the greatest importance that the graphite components be positioned closely in contact with each other. In the type of casting apparatus contemplated by Wagstaff, et. al., the graphite casting ring components are captured between upper and lower frame members to provide mechanical support and assure the positioning of the components. It was previously known to use the "barrel hoop" concept of placing the components of the annulus in upper and lower frames and then clamping the components using a clamping band or other structure—as, in principle, has been the practice for centuries in the manufacture of steel banded wooden barrels.

This approach is not satisfactory in the manufacture of other than circular molten metal graphite casting structures because the clamping force is not uniformly applied and because graphite is quite brittle with virtually no resilience. Thus, Wagstaff, et. al., employed special clamping structures and methods in which the components were clamped before being positioned between the upper and lower frame members. Obviously, all of the graphite components must be in place and undamaged before any of them can be clamped. The Wagstaff, et. al, pre-clamping concept is an improvement that helps make the manufacture of larger sized graphite casting annulus molds; however, this concept also introduces complications in assembly, as referred to, and in repair wherein the entire annulus must be re-built to make a minor repair. Additionally, for rectangular ingot making, the size of the annulus can be very large, requiring intricate machining on a very large piece of graphite. Also, specific convex profiles have to be provided in the annulus wall contour and as such manufacture of the mold by the clamping method using large graphite pieces is highly time consuming and expensive from material and labor point of view.

The present invention permits the manufacture of large and varied shape graphite annulus casting molds from a multiplicity of graphite casting annulus insert components that are individually positionable and fixed individually in position without need for clamping.

SUMMARY OF THE INVENTION

The present invention is embodied in apparatus and methods for foundry operations that substantially reduce the raw material costs, machining time, annulus mold fabrication and assembly time, and thereby assembly costs, and mold maintenance and repair costs, leading to an overall substantial reduction in the cost of tooling and ultimately in the cost of foundering the metal.

The invention also provides a low cost alternative for building proto-type tooling required for forming ingots of different shapes and sizes, thereby increasing the flexibility of the foundry operation to quickly adapt to new and complicated sizes and cast product contours. The invention also provides a savings in tooling, spares, consumables and inventory costs.

The present invention may be described, in one facet, as an improved molten metal casting annulus that comprises, in combination, an insert support and cooling frame configured and constructed to define an enclosed planar annular space and defining an annular face that faces said annular space that is generally perpendicular to the plane of said annular space and a very large number multiplicity of graphite casting annulus insert components (where the number of graphite components would be more than 200 for 100 inches perimeter of metal casting annulus) supported entirely without clamping on said insert support and cooling frame. In a preferred form of the invention, the frame defines one or more annular grooves adjacent said annular face. The insert components are fitted edge to edge on the annular face to define a molten metal casting annulus. The insert components, in a preferred embodiment, defined a lip which is snugly fitted in an annular groove in the support and cooling frame for positioning and locking said insert components in therein. In a preferred embodiment of the invention, the casting apparatus is designed to provide, in addition to the graphite annulus, a lubricating oil and an additional fluid medium selected from the group consisting of a highly heat vaporizable liquid medium with or without a gaseous medium that are simultaneously forced through the fluid permeable graphite components so that the oil and additional fluid medium discharge into the cavity at points on the inner peripheral surface of the casting face. Simultaneously, the molten metal body is chilled from points below the intermediate continuum.

In another preferred embodiment, the casting face of the insert components are coated with a slurry of sub-micron size colloidal graphite particles and molybdenum sulfide particles. These particles modify and define the characteristics of the casting face and provide a smooth stick resistant surface, over-coming any inconsistencies that may arise from the use of insert components not exactly the same thickness or which may have imperfections therein.

The lubricating oil with or without vaporizable liquids are preferably delivered by way of grooves on the back side, i.e., the side not facing the annulus, of the insert component are caused to diffuse simultaneously through the body of the ring, i.e., through each of the insert components, so as to discharge into the annulus at the inner peripheral surface of the casting ring while the molten metal mass is chilled and molded.

In certain embodiments, for example, the additional fluid medium is a gas. In the exemplary embodiment, the oil and gas are forced into the fluid permeable insert components through a plurality of spaced grooves extending about the rear of the graphite annulus, at the outer periphery thereof.

Fluid delivery means are also provided for simultaneously forcing a lubricating oil and an additional fluid medium selected from the group consisting of a highly heat vaporizable liquid medium with or without a gaseous medium, through the fluid permeable wall section so that the oil and additional fluid medium discharge into the cavity at points on the inner peripheral surface of the wall section opposite the intermediate continuum.

In a convenient embodiment, a lubricating oil is pumped into the aforesaid grooves along with a stream of pressurized gas such as air. Both oil and gas can be pumped into the same groove or grooves or, separately, into the respective grooves so that the oil and gas diffuse simultaneously through the body of the graphite casting ring and discharge into the cavity at the inner peripheral surface of the casting ring while the molten metal mass is chilled to form the chilled mass into an elongated billet of the metal.

The graphite is hot isostatically pressed or extruded, very fine grain, essentially flaw-free, high strength graphite such as the ATJ graphite sold by the Carbon Products Division of Union Carbide Corporation, Chicago, Ill. or equivalent grades provided by SGL Carbon Corporation of St. Marys, Pa. Preferably, it also machines to a fine surface finish and has a high thermal conductivity. Such graphite is sufficiently permeable to permit oil and gas to diffuse there through. In addition, such graphite permits the solid state diffusion of very fine, sub-micron size, colloidal graphite molybdenum disulphide powder. A coating of a mixture of these powder paints is applied, in preferred embodiment, to the surface of graphite inserts that becomes the casting face. The coating may be applied as a powder or as powders or, conveniently, as a slurry or suspension of such fine powders in deionized water and alcohol mixture.

As a different, but equivalent way of provide an oil-gas casting surface environment, caster oil, peanut oil or other lubricating oil may be delivered to either of the grooves suspended in a highly vaporizable liquid carrier such as alcohol, and the heat generated in the graphite ring during the casting operation is relied on to vaporize the carrier by the time it discharges at the inner peripheral face of the ring. The vapor of the carrier then becomes a part of the annulus about the metallic mass and may substitute entirely for the gaseous medium normally supplied to the grooves thus obviating any need for delivering gas to the same. Alternatively or additionally, the vapor of the carrier may be employed to modify the gaseous/vaporous character of the annulus, and/or to affect the top cooling of the metallic mass.

There are several possible embodiments of the invention, the preferred embodiment being depicted in the drawing and described hereinafter. These are, however, merely exemplary. In one embodiment, the graphite casting annulus insert components are so configured and constructed as to define a hook having a hook lip, said lip being snugly fitted in said annular groove for positioning and locking said insert components in said frame.

In another embodiment the graphite casting annulus insert components are configured and constructed to define a downwardly extending insertion lip which is snugly fitted in said annular groove for positioning and locking said insert components in said frame.

The support and cooling frame may define a second annular groove adjacent said annular face, and the graphite casting annulus insert components be configured and constructed to define a downwardly extending insertion lip, said downwardly extending insertion lip being snugly fitted into said second annular groove.

The invention includes a method of manufacturing a molten metal casting annulus that comprising an inset support and cooling frame configured and constructed to define an enclosed planar annular space and defining in annular face that faces the annular space and that is generally perpendicular to the plane of said annular space, the frame further defining an annular groove adjacent the annular face, and a large number of graphite casting annulus insert components supported entirely without clamping on said insert support and cooling frame, said insert components being fitted edge to edge around said annular face to define said annulus, the insert components having a lip snugly fitted in said annular groove for positioning and locking said insert components in said frame. The method comprises chilling the graphite casting annulus insert components before inserting the lip of the respective insert components into the annular groove in said frame and allowing said insert components to warm and thermally expand thereby locking the lip in position in said groove by thermally induced force between the insert component and the support frame.

The graphite casting annulus insert components may be configured and constructed to define a hook having a hook lip, in which case the method comprises chilling the hook lip, then inserting said chilled hook lip into said annular groove in said frame, and then allowing said lip to warm and thermally expand locking the lip in position in said groove by thermally induced force between the insert component and the support frame.

The frame define a second annular groove adjacent said annular face and the graphite casting annulus insert components may be configured and constructed to define, in addition to said hook lip, a downwardly extending insertion lip, and the method may comprise chilling said downwardly extending insertion lip, then inserting said chilled downwardly extending lip into said second annular groove in said frame, and then allowing said downwardly extending lip to warm and thermally expand locking said downwardly extending lip in position in said second groove by thermally induced force between the insert component and the support frame.

The invention contemplates a molten metal casting annulus comprising an insert support and cooling frame configured and constructed to define an enclosed planar annular space, said frame defining an annular face that faces said annular space and that is generally perpendicular to the plane of said annular space and a multiplicity of graphite casting annulus insert components supported entirely without clamping on said insert support and cooling frame. The insert components are fitted edge to edge around said casting annulus to define said annulus and secured thereto by thermally induced engaging force between said insert and said insert support and cooling frame and sealed to one another by said thermally induced engaging force.

The insert support and cooling frame is, in one preferred embodiment, configured and constructed to define at least one annular groove adjacent said annular face and the graphite casting annulus insert components are so configured and constructed as to define a hook having a hook lip, the lip being snugly fitted in said annular groove for positioning and locking said insert components in said frame.

The insert support and cooling frame may also be configured and constructed to define at least two annular grooves adjacent said annular face and wherein the graphite casting annulus insert components are so configured and constructed as to define an insert lip and to define a hook having a lip, said hook lip and said insert lips being snugly fitted in said annular grooves for positioning and locking said insert components in said frame. A special quality of graphite inserts to be used in the present invention is that the graphite material should allow solid diffusion of fine (submicron size) colloidal graphite powder mixed with fine (submicron size) molybdenum disulphide powder. A coating of these powder paints is applied, in preferred embodiments, on top of the inner surface wall, 40, of the graphite inserts. Additionally, the graphite inserts have the interconnected porosity to allow diffusion of lubricating oil in liquid or vapor form.

The invention is embodied, in one form, in a molten metal continuous casting apparatus comprising: a multiplicity of graphite casting annulus insert components, an annular insert support and cooling frame defining an insert supporting surface, and a annular closure plate, said insert support and cooling frame and said closure plate being configured and constructed to define, when secured together, an annular cooling fluid chamber. The insert support and cooling frame are configured and constructed to position said insert supporting surface in close thermal communication through a thermally conductive wall with the cooling fluid chamber and means are provided for securing the insert support and cooling frame and closure plate together to form said cooling fluid chamber. The multiplicity of graphite casting annulus insert components are secured in position on and receiving cooling from the insert support and cooling frame to define a planar annulus configured and constructed to serve as a surface against which molten metal can be cast for forming an ingot. The multiplicity of graphite casting annulus insert components are, in one of the more preferred embodiments, secured by thermally induced force to the annular insert support and cooling frame. The insert support and cooling frame may be configured and constructed to define an enclosed planar annular space, said frame defining an annular face that faces said annular space and that is generally perpendicular to the plane of said annular space, said frame further defined an annular groove adjacent said annular face. The graphite casting annulus inset components are supported entirely without clamping on said insert support and cooling frame, being fitted edge to edge around said casting annulus to define said annulus. The insert components may preferably comprise a lip snugly fitted in said annular groove for positioning and locking said insert components in said frame. Alternatively, or in addition, the graphite casting annulus insert components may be configured and constructed as to define a hook having a lip, said lip being snugly fitted in said annular groove for positioning and locking said insert components in said frame and/or a downwardly extending insertion lip likewise fitted in an annular groove for positioning and locking said insert components in said frame.

Other features and advantages of the invention will appear from the drawing and the description which follow.

DESCRIPTION OF THE PREFERRED EMBODIMENTS

The embodiments and structures and steps described are provided as a description of the invention, the manner of construction and use of the apparatus, and the best mode of carrying out of the invention, and are not limiting as to the scope of the invention.

Figure 1:
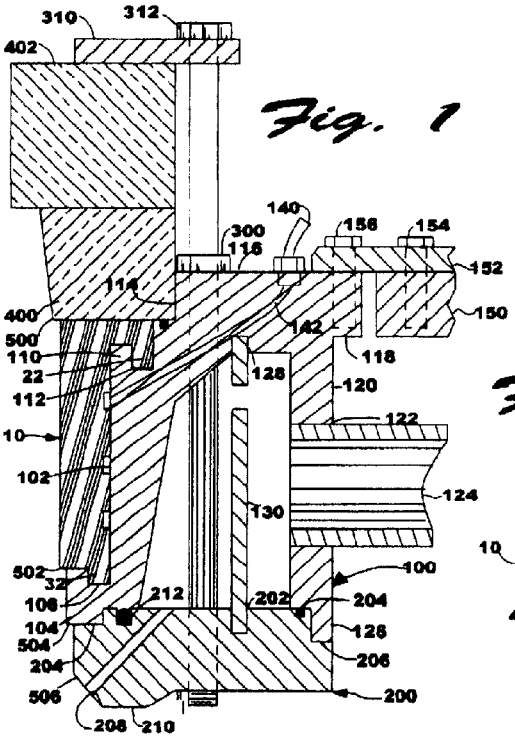
FIG. 1 is a cross-sectional view taken radially of and perpendicular to the plane of the casting annulus.

Reference is first made briefly to FIG. 1 with respect to which the overall construction and method assembly and manufacture are described in summary terms.

A multiplicity of graphite casting annulus insert components 10, 10a, 10b, 10c, etc., are support entirely without clamping on the inset support and cooling frame 100, being fitted edge to edge. Hook structure on the top and the lip structure on the bottom of the respective graphite casting annulus insert components 10 are individually fitted into grooves in the insert support and cooling frame 100. The rear surfaces of the graphite casting annulus insert components 10 rest against a supporting surface of the insert support and cooling frame 100. The insert support and cooling frame 100 is supported in any convenient means, e.g., by a casting table 150 by a suitable bracket 152. A closure plate 200 secured to the bottom of the insert support and cooling frame 100 defines with the support and cooling frame a cooling water chamber. The method of use of the invention is substantially the same as the method used in the prior art, such as the prior art references incorporated herein by reference. The molten metal is cast into the annulus supported from below and the ingot is lowered while additional molten metal is added. The surface of the molten metal is maintained against the graphite casting surface defined by a multiplicity of graphite casting annulus insert components 10 supported by, locked in position on and receiving cooling from the insert support and cooling frame 100, the cooling chamber of which is defined by the support and cooling frame and bottom closure 200, which may be held together in any convenient manner such as by bolt 300 and accompanying washers, nuts, or other fasteners as desired. Ceramic dams, e.g., as shown at 400 and 402, are often used in association with a casting annulus and such structures are accommodated by the present invention, through they are not integral to the inventive concept, method or structure.

The graphite casting annulus in this invention is made up using, in the manner described hereinafter, a multiplicity of individual graphite casting annulus insert components 10 which appear in each of the figures. A plurality of additional such components 10a, 10b, and 10c, appear in FIG. 1 simply to indicate the manner in which the components are fitted end-to-end to form the casting annulus. The term "annulus" is given a liberal definition generally as the term is used in U.S. Pat. Nos. 4,947,925 and 4,947,925, i.e. to mean an enclosed planar space, which may or may not be circular, surrounded by a casting wall, e.g., of graphite, extending more or less perpendicular to the plane of the enclosed space, the casting wall being configured and constructed to serve as a surface against which molten metal can be cast for forming an ingot.

In the particular embodiment shown in the figures, the graphite casting annulus insert components 10 have, making reference to the position in use, a top 20 and a bottom 30, a front face 40 and back face 50, along with edges 60 and 70. As will be seen, in use, the metal is cast against the front face between the top and the bottom.

Figure 3:
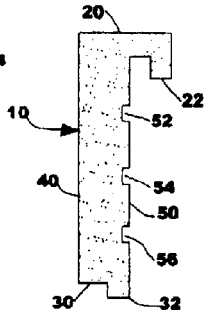
FIG. 3 is an end view of one of the graphite casting annulus insert components showing the outline configuration and one end surface of the component; the other end being a mirror image of the first end.
Figure 5:
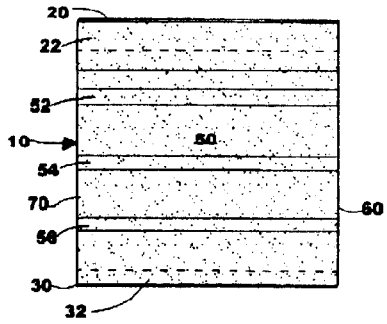
FIG. 5 is a rear plan view of one of the graphite casting annulus insert components showing the surface of the component that, in use, will be supported on the single support ring of the casting annulus.

Referring to FIG. 3, in particular, it will be seen that the top portion 20 of the graphite casting annulus insert component 10 extends rearwardly from the front face 40 and defines a depending lip 22, the top portion thus being configured and constructed to define a hook. The use of a depending lip, as shown in FIGS. 2, 3 and 4 is a convenient and presently preferred embodiment, but an upwardly extending lip defining a hooking structure would be equivalent.

Continuing reference to FIG. 3, the bottom 30 of graphite casting annulus insert component 10 is configured and constructed to define on the rearward portion of the bottom a downwardly extending insertion lip 32.

Figure 4:
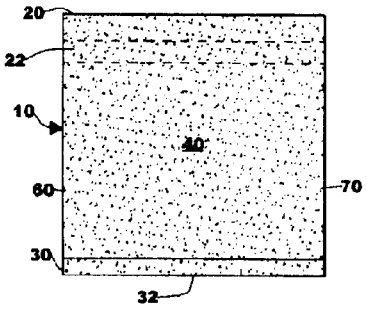
FIG. 4 is a front plan view of one of the graphite casting annulus insert components showing the surface of the component that, in use, will be exposed inside the casting annulus.

Referring to FIGS. 3 and 4 momentarily, it will be seen that the front face is smooth and, in this embodiment, planar. Since the front face is the face against 40 which the molten metal is cast it is desirable that it be smooth to prevent entrapment of the molten metal. Generally it is possible to make casting molds of any size and angular shape using planar surfaced graphite casting annulus insert components; however, corresponding components in which the faces are arcuate or curved can be made. The graphite is commonly a molded, very fine grain, essentially flaw-free, high strength graphite such as the ATJ graphite sold by the Carbon Products Division of Union Carbide Corporation, Chicago, Ill. Preferably, it also machines to a fine surface finish and has a high thermal conductivity. Such graphite is sufficiently permeable to permit oil and gas to diffuse there through. In addition, such graphite permits the solid state diffusion of very fine, sub-micron size, colloidal graphite molybdenum disulphide powder. A coating of a mixture of these powder paints is applied, in preferred embodiment, to the surface 40 of graphite inserts that becomes the casting face. The coating may be applied as a powder or as powders or, conveniently, as a slurry or suspension of such fine powders in an oil.

Figure 2:
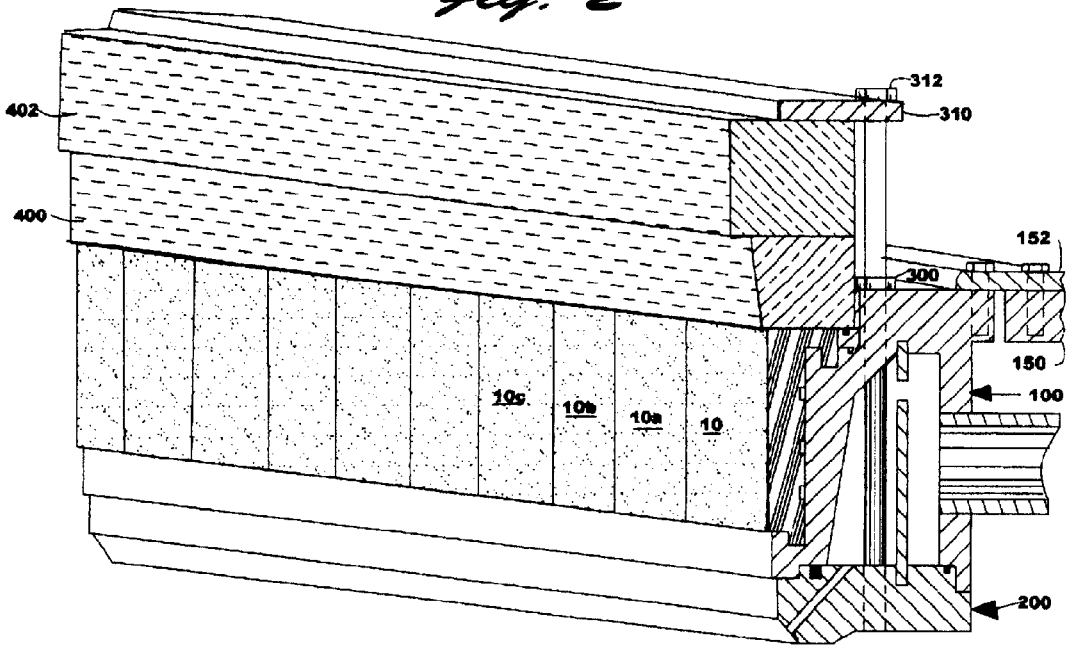
FIG. 2 depicts a portion of the internal surfaces of the annular mold in plan view, with the cross-section of the annular mold being shown in the right hand portion of the figure.

Referring to FIGS. 2 and 4 momentarily, it will be seen that the back face 50 of graphite casting annulus insert component 10 is generally smooth but, in this embodiment, has a series grooves 52, 54 and 56 extending across the back face. These grooves provide as reservoirs of the lubricating fluid which is forced through the graphite components. The grooves are also useful in relieving thermal stresses during assembly of the annulus and in use. As will be described, in a preferred embodiment of the invention, the casting apparatus is designed to provide, in addition to the graphite annulus, a lubricating oil and an additional fluid medium selected from the group consisting of a highly heat vaporizable liquid medium with or without a gaseous medium that are simultaneously forced through the fluid permeable graphite components so that the oil and additional fluid medium discharge into the cavity at points on the inner peripheral surface of the casting face. Simultaneously, the molten metal body is chilled from points below the intermediate continuum.

The graphite casting annulus insert components have been described, generally, in reference to planar-faced structures; however, these components, being small and easily machinable can be fabricated in virtually any shape to be assembled in any location of the annulus in any desired annulus configuration.

Unlike the components and systems of the prior art, the graphite casting annulus insert components as disclosed herein are self-positioning and self-locking in the annulus structure, requiring no clamping of any kind.

Furthermore, only one frame member is used to entirely support and define the position of the graphite casting annulus insert components.

Now, making more detailed reference to FIGS. 1 and 2 the insert support and cooling frame 100, which provides part of the coolant circulation path and the entire mechanical support and positioning of the graphite casting annulus inset components 10, and its relation to the components of the mold are described.

Insert support and cooling frame 100 is configured and constructed to define a graphite cooling and support face 102 of such configuration that the back surface 50 of graphite casting annulus insert components lie snugly against such face. This graphite cooling and support face 102 faces inwardly, i.e. toward the space enclosed by the annulus and extends generally vertically, i.e., more or less perpendicular to the plane of the casting annulus. Extending from the bottom of the face 102 toward the center of the annulus a forward support projection 104 is configured and constructed to form upwardly extending projection which defines a groove 106 configured and constructed snugly to receive the insertion lip 32 that extends downwardly from the rearward portion of the bottom 30. Extending upwardly from the face 102 is configured and constructed to form an upward projection 110 that defines a groove 112 that is configured and constructed snugly to receive the hook lip 22 of the graphite casting annulus insert component 10. Upon expansion, the edges of the graphite casting annulus insert components 10 are under compression with each other, thus making a liquid-tight seal with one another to prevent entry of molten metal there between.

It will, thus, be seen that the graphite casting annulus insert components 10 are supported and positioned without clamping entirely by the insert support and cooling frame 100.

In order to assure that the exact position of the individual graphite casting annulus insert components, these components are assembled by the following method. The support ring is positioned. Each of the individual graphite casting annulus insert components is pre-positioned and then cut to the proper length, if needed, and/or machined to a particular configuration, e.g., one end may be beveled to form a corner with another beveled end individual graphite casting annulus insert component. Then, the individual graphite casting annulus insert component is chilled in liquid nitrogen thermally shrinking the graphite. The liquid nitrogen chilled individual graphite casting annulus insert component is then positioned on the insert support and cooling frame 100, the rear face 50 of the individual graphite casting annulus insert component resting against the inward face 102 of insert support and cooling frame, the lip insertion lip 32 being received in the groove 106 and the hook lip 22 being received in the groove 112. Upon warming, the graphite lips expand in the respective grooves and lock the position of the individual graphite casting annulus insert component in inset support and cooling frame. No clamp step or structure, or other structure, is required or used.

It will be seen that insofar as the construction of the annulus per se is concerned, the foregoing description is complete. However, the casting mold comprises additional components, that are now described.

In addition to the components of the insert support and cooling frame 100 just described, this structure comprises an upwardly extending face 114, above the level of the individual graphite casting annulus insert, and an upper surface 116. In the preferred embodiment, a rearwardly extending mounting lip 118 is provided for attaching the insert support and cooling frame 100 to a casting table in a commonly known manner, as will be described. The rear wall 120 of the insert support and cooling frame 100 defines the orifice 122 for connection to a conduit 124 to provide a source of cooling water. The rear wall 120 also defines a positioning lip 126. The upwardly extending inner walls of the insert support and cooling frame 100 and the upper wall, which has a groove 128 formed therein that will be discussed below, define, generally the top and two sides of a water cooling chamber.

The bottom of the water cooling chamber is defined by the upper surface of the bottom closure plate 200 which defines an upper surface which defines a weir-receiving groove 202 which may have an O-ring groove 204 formed therein and a shelf structure 206 mating with the positioning lip of the insert support and cooling frame 100. A weir 130 is mounted in the grooves 128 and 202 in the insert support and cooling frame 100 and the bottom closure plate 200 respectively. The bottom closure plate 200 is configured and constructed to define a plurality of cooling water outlets surrounding the ingot being cast, one of these is shown at 208. The use of multiple water jets in this position is known, although the configuration of the cooling chamber in the present invention differs from those known in the prior art. The water jets 208 intersect the upper surface of the bottom closure plate and exit adjacent the bottom front portion 210 of the closure plate. The inner surface wall of the bottom closure plate while forming the wall of the annulus is substantially, (by between 0.010" and 0.10'), recessed from the inner wall of the support frame by forming a step in the inner surface of the annulus. This step is an important feature of the invention as it prevents the retouching of the solidified ingot shell back to the annulus wall thereby preventing the formation of subsurface liquation bond continuation. The upper surface of the closure plate may also define another O-ring groove 212 and a shelf 214 for being positioned against the bottom of the insert support and cooling frame 100.

The insert support and cooling frame 100 is supported on a conventional casting table in a common manner. In this embodiment, wherein the casting table top is indicated at 150, the insert support and cooling frame 100 is supported by means of brackets 152 bolted by bolts 154 and 156 respectively to the casting table and to the insert support and cooling frame 100.

In order to seal the water cooling chamber just described, a bolt 300 extends through passages through the inset support and cooling frame 100 and the closure plate 200 to clamp the two halves together to seal the components against the O-rings. This clamping action also locks the weir 130 in place. It is to be noted that this clamping action plays no part in positioning and assembling the individual graphite casting annulus insert components. In practice, the entire water chamber structure would normally be assembled before attaching the individual graphite casting annulus insert components.

Annular ceramic plate 400 and annular ceramic dam 402 are secured to the casting mold by bracket 310 and a bolt 312 to hold these components in place. Again, it is noted that the securement of the ceramic blocks in position is wholly unrelated to the positioning of the individual graphite casting annulus insert components 10 which are self-locked to the insert support and cooling frame 100 as described above, regardless of whether the ceramic blocks are used.

It will be understood, of course, that, except for the individual graphite casting annulus insert components 10 and the conventional components such as bolts and nuts, the components described, e.g. the insert support and cooling frame 100, the closure plate 200, the mounting bracket 150 and the ceramic blocks 400 and 402 are either unitarily configured and constructed or assembled to be in an annular configuration generally of the size and shape of the annular casting mold of which the graphite casting annulus forms the molten metal casting surface that defines the shape, the corner curvatures and lateral dimensions of the ingot to be cast.

Thus, the casting apparatus is designed to provide, in addition to the graphite annulus, a lubricating oil and an additional fluid medium selected from the group consisting of a highly heat vaporizable liquid medium and a gaseous medium that are simultaneously forced through the fluid permeable graphite components so that the oil and additional fluid medium discharge into the cavity at points on the inner peripheral surface of the casting face. Simultaneously, the molten metal body is chilled from points below the intermediate continuum.

The casting face of the insert components are coated with a slurry of submicron size colloidal graphite particles and molybdenum sulfide particles. This coating modifies and defines the characteristics of the casting face and provide a smooth stick resistant surface, over-coming any inconsistencies that may arise from the use insert components not exactly the same thickness or which may have imperfections therein.

Lubricating oil and a gas are preferably delivered in any desired mechanical way. For example, a source of lubricating oil and/or gas 140 may deliver oil and/or gas to the of grooves on the back side 50, i.e., the side not facing the annulus, of the insert component through suitable ports and passage, one exemplary passage being shown at 142. The oil and gas are caused to diffuse simultaneously through the body of the ring, i.e., through each of the insert components, so as to discharge into the annulus at the inner peripheral surface of the casting ring while the molten metal mass is chilled and the mold.

In the exemplary embodiment, the oil and gas are forced into the fluid permeable insert components through a plurality of spaced grooves 52, 54, 56 extending about the rear of the graphite annulus, at the outer periphery thereof.

Fluid delivery means simultaneously force a lubricating oil and an additional fluid medium selected from the group consisting of a highly heat vaporizable liquid medium and a gaseous medium, through the fluid permeable wall section so that the oil and additional fluid medium discharge into the cavity at points on the inner peripheral surface of the wall section opposite the intermediate continuum.

In a convenient embodiment, a lubricating oil is pumped into the aforesaid grooves along with a stream of pressurized gas such as air. Both oil and gas can be pumped into the same groove or grooves or, separately, into the respective grooves so that the oil and gas diffuse simultaneously through the body of the graphite casting ring and discharge into the cavity at the inner peripheral surface of the casting ring while the molten metal mass is chilled to form the chilled mass into an elongated billet of the metal.

The graphite is commonly a molded, very fine grain, essentially flaw-free, high strength graphite such as the ATJ graphite sold by the Carbon Products Division of Union Carbide Corporation, Chicago, Ill. Preferably, it also machines to a fine surface finish and has a high thermal conductivity. Such graphite is sufficiently permeable to permit oil and gas to diffuse there through. In addition, such graphite permits the solid state diffusion of very fine, submicron size, colloidal graphite molybdenum disulphide powder. A coating of a mixture of these powder paints is applied, in preferred embodiment, to the surface of graphite inserts that becomes the casting face. The coating may be applied as a powder or as powders or, conveniently, as a slurry or suspension of such fine powders in an oil.

As a different, but equivalent way of provide an oil—gas casting surface environment, castor oil, peanut oil or other lubricating oil may be delivered to either of the grooves suspended in a highly vaporizable liquid carrier such as alcohol, and the heat generated in the graphite ring during the casting operation is relied on to vaporize the carrier by the time it discharges at the inner peripheral face of the ring. The vapor of the carrier then becomes a part of the annulus about the metallic mass and may substitute entirely for the gaseous medium normally supplied to the grooves thus obviating any need for delivering gas to the same. Alternatively or additionally, the vapor of the carrier may be employed to modify the gaseous/vaporous character of the annulus, and/or to increase the top cooling of the metallic mass.

It will be seen that present invention is embodied in an improved molten metal casting apparatus and a method of manufacturing the same. An insert support and cooling frame that configured and constructed to define an enclosed planar annular space defines defining an annular support face that faces the annular space generally perpendicular to the plane of said annular space. The frame, unitarily or in cooperation with one or more closures, defines a cooling fluid chamber. The support face is in direct close thermal communication with the cooling fluid chamber, e.g., through a conductive wall. The frame is made of a conductive material, e.g., steel, aluminum and its alloys or other metals and metal alloys. Thus, the support face is cooled by the cooling fluid, e.g., water, in the cooling chamber. It is known to eject water from a cooling chamber toward the ingot being formed to provide direct water chill on the face of the ingot to assure that the ingot remains solid and integral and such is provided for in this invention. A multiplicity of graphite casting annulus insert components are supported entirely without clamping on the support face of the insert support and cooling frame. Consequently, the insert components are cooled through the conductive frame material and the support face by the cooling fluid in the cooling chamber. In a preferred form of the invention, the frame defines one or more an annular grooves adjacent said annular face. The insert components are fitted edge to edge on the annular face to define a molten metal casting annulus. The insert components, in a preferred embodiment, defined one or more lips, which may be part of hook structure. The lip or lips are snugly fitted in an annular groove in the support and cooling frame for positioning and locking said insert components in therein. The apparatus is, in the preferred embodiment, manufactured by chilling the graphite casting annulus insert components before inserting a lip of the respective insert components into an annular groove in the frame and, thereafter, allowing said insert components to warm and thermally expand thereby locking the lip in position in said groove by thermally induced force between the insert component and the support frame. The insert components are fitted edge to edge around said annular frame to define said casting annulus and molten metal casting surface and are secured thereto by thermally induced engaging force between said insert and said insert support and cooling frame. The insert components are and sealed to one another by the thermally induced engaging force, i.e. when the components are removed from the chilling medium, liquid nitrogen, and positioned on the support face and allowed to warm the thermal expansion forces the edges together to form a liquid tight seal and creates a thermally induced force between portions of the components and the support frame, e.g., the lip expands in the groove to form a tight, structurally firm securing force.

A colloidal graphite coating is then applied to the entire upper inner wall of the graphite annulus to mask the minute incoherencies, if any, along the edge of the two graphite insert components. Application of the said coating provides an even and smoother surface as a casting face for the surface of molten aluminum and/or its alloys.

The invention substantially reduces i) the raw material cost (i.e. graphite cost), ii) machining time (i.e. support cavity machining time and graphite machining time), and thereby machining costs, iii) annulus mold fabrication and assembly time and thereby assembly costs, and iv) mold maintenance and repair costs; leading to an overall substantial reduction in the cost of tooling an ultimately in the cost of foundering the metal. The invention also provides a low cost alternative for building proto-type tooling required for forming ingots of different shapes and sizes, thereby increasing the flexibility of the foundry operation to quickly adapt to new and complicated sizes and cast product contours. The invention also provides a savings in tooling, spares, consumables and inventory costs.

Reference is now made to FIG. 1 again and to the step-back structure defined by the components as previously described and identified by numerals 500, 502, 504 and 506. The step 500 is between the ceramic dam 400 and the face of the casting ring surface defined by the inserts. Step 500 is typically from about 0.010 to 0.10 inch. The amount of step-back is not critical but the step-back is important. The term "step-back" is used here to mean that the structure said to be stepped back is outward from the central portion of the casting annulus as compared with the next higher structure. Like wise, step 502 and step 504 are typically from about 0.020 to 0.10 inch. The step 506 is much deeper and, in a preferred form, is simply a beveled edge. As clearly shown in FIG. 1, the insert support and cooling frame and the graphite casting annulus insert components are constructed and configured to define a step of from about 0.01 to about 0.10 inch outward above the central portion of the casting annulus between the top of the graphite casting surface and a step of from about 0.01 to about 0.10 inch between the bottom of the graphite casting surface and the structure below said casting surface. These steps are an important feature of the invention in that they prevent the retouching of the solidified ingot shell back to the annulus wall thereby preventing the formation of subsurface liquation bond continuation.

Within the principles set forth, and within the scope of the invention as defined in the claims, the invention may be utilized in many variations and forms, as well be apparent to those skilled in the art.

Industrial Application

This invention is useful in the metal foundry industry.

What is claimed is:

1. Molten metal continuous casting apparatus comprising:

a multiplicity of graphite casting annulus insert components (10), an annular insert support and cooling frame (100) defining an insert supporting surface, a annular closure plate (200), said insert support and cooling frame and said closure plate being configured and constructed to define, when secured together, an annular cooling fluid chamber, said insert support and cooling frame being configured and constructed to position said insert supporting surface in close thermal communication through a thermally conductive wall with the cooling fluid chamber, means securing the insert support and cooling frame and closure plate together to form said cooling fluid chamber, said multiplicity of graphite casting annulus insert components being secured without clamping in position on, supported by and receiving cooling from the insert support and cooling frame alone to define a planar annulus configured and constructed to serve as a surface against which molten *metal can be cast for forming a metal ingot*.

2. The casting annulus of claim 1 wherein the graphite casting annulus insert components are composed of permeable graphite for solid state diffusion of submicron sized colloidal graphite and molybdenum sulfide and for transporting lubricating oil in liquid or vapor form there through.

3. The casting annulus of claim 2 further comprising a coating of submicron size molybdenum disulfide and colloidal graphite on the graphite casting annulus insert components.

4. The casting annulus of claim 2 wherein the graphite casting annulus insert components are composed of permeable graphite for transporting lubricating oil in liquid or vapor form there through.

5. The molten metal continuous casting apparatus of claim 1 wherein the multiplicity of graphite casting annulus insert components (10) are secured by thermally induced force to the annular insert support and cooling frame (100).

6. The molten metal continuous casting apparatus of claim 1 wherein the insert support and cooling frame (100) is configured and constructed to define an enclosed planar annular space, said frame defining an annular face that faces said annular space and that is generally perpendicular to the plane of said annular space, said frame further defining an annular groove (106, 112) adjacent said annular face, and said multiplicity of graphite casting annulus insert components (10) supported entirely without clamping on said insert support and cooling frame (100), said insert components being fitted edge to edge around said casting annulus to define said annulus, said insert components further comprising a lip snugly fitted in said annular groove for positioning and locking said insert components in said frame.

7. The molten metal continuous casting apparatus of claim 6 wherein the graphite casting annulus insert components (10) are so configured and constructed as to define a hook (22) having a lip, said lip being snugly fitted in said annular groove for positioning and locking said insert components in said frame.

8. The molten metal continuous casting apparatus of claim 6 wherein the graphite casting annulus insert components (10) are configured and constructed to define a downwardly extending insertion lip (32).

9. The molten metal continuous casting apparatus of claim 6 wherein the frame defines a second annular groove adjacent said annular face and wherein the graphite casting annulus insert components are configured and constructed to define a downwardly extending insertion lip, said downwardly extending insertion lip being snugly fitted into said second annular groove.

10. The casting annulus of claim 9 wherein the graphite casting insert components are composed of permeable graphite for solid state diffusion of submicron sized colloidal graphite and molybdenum sulfide and for transporting lubricating oil in liquid or vapor form there through.

11. The casting annulus of claim 10 further comprising a coating of submicron size molybdenum disulfide and colloidal graphite on the graphite casting annulus insert components.

12. The casting annulus of claim 10 wherein the graphite casting annulus insert components are composed of permeable graphite for transporting lubricating oil in liquid or vapor form there through.

13. The molten metal continuous casting apparatus of claim 5 wherein the insert support and cooling frame (100) is configured and constructed to define an enclosed planar annular space, said frame defining an annular face that faces said annular space and that is generally perpendicular to the plane of said annular space, said frame further defining an annular groove (106, 112) adjacent said annular face, said multiplicity of graphite casting annulus insert components (10) being supported on said insert support and cooling frame (100), said insert components being fitted edge to edge around said casting annulus to define said annulus, said insert components further comprising a lip snugly fitted in said annular groove for positioning and locking said insert components in said frame.

14. The molten metal continuous casting apparatus of claim 13 wherein the graphite casting annulus insert components (10) are so configured and constructed as to define a hook (22) having a lip, said hook lip being snugly fitted in said annular groove for positioning and locking said insert components in said frame.

15. The molten metal continuous casting apparatus of claim 14 wherein the graphite casting annulus insert components (10) are configured and constructed to define a downwardly extending insertion lip (32).

16. The molten metal continuous casting apparatus of claim 6 wherein the frame defines a second annular groove adjacent said annular face and wherein the graphite casting annulus insert components are configured and constructed to define a downwardly extending insertion lip, said downwardly extending insertion lip being snugly fitted into said second annular groove.

17. The invention of claim 1 wherein the insert support and cooling frame and the graphite casting annulus insert components are constructed and configured to define a step of from about 0.01 to about 0.10 inch above the graphite casting surface and a step of from about 0.01 to about 0.10 inch between the bottom of the graphite casting surface and the structure below said casting surface.

18. The invention of claim 16 wherein the insert support and cooling frame and the graphite casting annulus insert components are constructed and configured to define a step of from about 0.01 to about 0.10 inch above the graphite casting surface and a step of from about 0.01 to about 0.10 inch between the bottom of the graphite casting surface and the structure below said casting surface.

19. Molten metal continuous casting apparatus comprising: a multiplicity of graphite casting annulus insert components (10), an annular insert support and cooling frame (100) defining an insert supporting surface, a annular closure plate (200), said insert support and cooling frame and said closure plate being configured and constructed to define, when secured together, an annular cooling fluid chamber, said insert support and cooling frame being configured and constructed to position said insert supporting surface in close thermal communication through a thermally conductive wall with the cooling fluid chamber, means securing the insert support and cooling frame and closure plate together to form said cooling fluid chamber, said multiplicity of graphite casting annulus insert components being secured without clamping in position on, supported by and receiving cooling from the insert support and cooling frame alone to define a planar annulus configured and constructed to serve as a surface against which molten metal can be cast for forming an ingot, the number of graphite components being at least about 200 for each 100 inches of perimeter of metal casting annulus.

* * * * *